US009389101B2

(12) United States Patent
Ezaki et al.

(10) Patent No.: US 9,389,101 B2
(45) Date of Patent: Jul. 12, 2016

(54) READHEAD CONTROL MECHANISM WHICH MAINTAINS A CONSTANT GAP BETWEEN A READHEAD AND A SCALE OF AN OPTICAL ENCODER

(71) Applicants: Yutaka Ezaki, Tokyo (JP); Noboru Itoh, Tokyo (JP)

(72) Inventors: Yutaka Ezaki, Tokyo (JP); Noboru Itoh, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 361 days.

(21) Appl. No.: 13/847,568

(22) Filed: Mar. 20, 2013

(65) Prior Publication Data

US 2013/0248698 A1 Sep. 26, 2013

(30) Foreign Application Priority Data

Mar. 26, 2012 (JP) .................................. 2012-069183

(51) Int. Cl.
*G01D 5/347* (2006.01)
*G01D 5/244* (2006.01)

(52) U.S. Cl.
CPC ........ *G01D 5/34715* (2013.01); *G01D 5/24438* (2013.01)

(58) Field of Classification Search
CPC combination set(s) only.
See application file for complete search history.

(56) References Cited

U.S. PATENT DOCUMENTS

| 4,811,133 | A | * | 3/1989 | Nakadai et al. ............ 360/77.03 |
| 5,519,686 | A | * | 5/1996 | Yanagisawa et al. ......... 369/126 |
| 2004/0165484 | A1 | * | 8/2004 | Hsu et al. .................. 369/30.16 |

FOREIGN PATENT DOCUMENTS

| JP | 10-213455 | 8/1998 |
| JP | 2010-249602 | 11/2010 |

OTHER PUBLICATIONS

Office Action mailed Nov. 17, 2015 in Japanese Application No. 2012-069183 filed Mar. 26, 2012 (w/English translation).

* cited by examiner

*Primary Examiner* — Francis M Legasse, Jr.
(74) *Attorney, Agent, or Firm* — Oblon, McClelland, Maier & Neustadt, L.L.P.

(57) ABSTRACT

A readhead control mechanism serves to control a readhead included in an optical encoder that measures a mechanical displacement between a fixed portion and a movable portion by reading out a gradation mark on a scale provided on the fixed portion, by using the readhead that is provided on the movable portion. The readhead mechanism includes a securing member that secures the readhead onto the movable portion, an actuator that is directly or indirectly secured onto the readhead to shift the readhead in an approaching direction or in a distancing direction, and an actuator controller that controls the actuator to maintain a constant distance between the readhead and the scale.

5 Claims, 11 Drawing Sheets

READHEAD CONTROL MECHANISM WHICH MAINTAINS A CONSTANT GAP BETWEEN A READHEAD AND A SCALE OF AN OPTICAL ENCODER

CROSS-REFERENCE TO RELATED APPLICATION

This application claims the benefit of Japanese Patent Application No. 2012-69183, filed on Mar. 26, 2012, the entire disclosure of which is incorporated by reference herein.

FIELD

This application relates generally to a readhead control mechanism and an optical encoder.

BACKGROUND

Linear encoders for measuring mechanical displacements between an object and another object in linear directions (for example, a relativistic travel distance of an object in relation to another object), and rotary encoders for measuring mechanical displacements in rotational directions (for example, a rotational angle of an object relative to another object) are known. Patent Literature 1, Unexamined Japanese Patent Application Kokai Publication No. 2010-249602, discloses an optical encoder that measures a mechanical displacement between two objects by reading out a graduation mark on a scale provided on an object by using a readhead provided on another object.

In reference to optical encoders, a gap distance between a scale and a readhead needs to be maintained within a specified allowable limit of error (hereinafter, within "the tolerance") due to properties of the optical encoders. However, the gap may occasionally be found outside of the specified tolerance due to deformations in attachment portions of the scale and of the readhead; the deformations caused by heat, a physical shock, aging or the like. Hence, precision and accuracy of measurements in the optical encoders drop substantially so that a normal course of operations for encoder embodied products would be unattainable.

The present invention has been made in view of these problems, and it is an object of the present invention to provide a readhead control mechanism including an encoder capable of maintaining a high measurement precision and accuracy of an encoder, and an optical encoder.

SUMMARY

A readhead control mechanism according to the present invention is directed to a readhead control mechanism for controlling a readhead included in an optical encoder that measures a mechanical displacement between a first object and a second object by reading out a scale provided on the first object by the readhead provided on the second object, including a securing member for securing the readhead onto the second object so that the readhead can be shifted in a approaching direction that the readhead approaches the scale and in a distancing direction that the readhead distances away from the scale, an actuator that is directly or indirectly secured to the readhead, for shifting the readhead in the approaching direction or in the distancing direction, and an actuator controller for controlling the actuator to maintain a constant distance between the readhead and the scale.

The present invention is able to provide the readhead control mechanism including the encoder that is capable of maintaining the high measurement precision and accuracy, and the optical encoder.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments of the present invention are explained with reference to the figures.

Embodiment 1

A readhead control mechanism 400 according to the embodiment of the present invention serves to control a position of a readhead 320 in order to maintain a gap distance within a specified tolerance between a scale 310 and the readhead 320. Hereinafter, the readhead control mechanism 400 of this embodiment is explained with reference to a mechanical component 1. This exemplary mechanical component 1 is provided with an optical encoder 300 including the readhead 320 that is controlled by the readhead control mechanism 400.

Figure 1A:
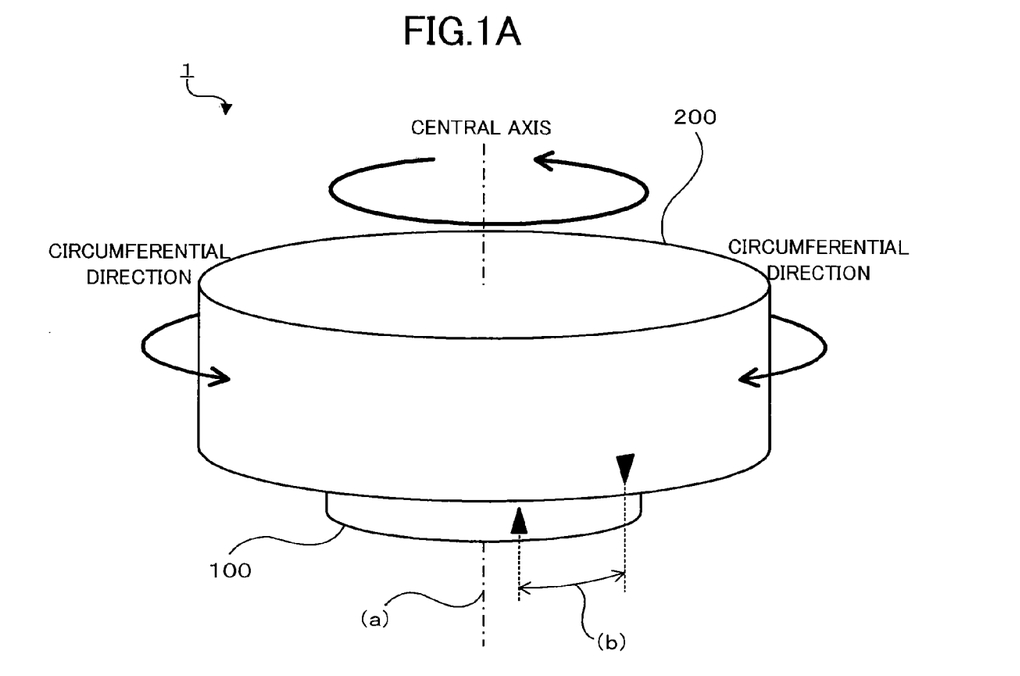
FIG. 1A is a perspective view of a mechanical component including the readhead control mechanism according to an embodiment of the present invention.

The mechanical component 1 constitutes a rotating portion that is contained within an apparatus such as joints of a robot and a rotating mechanism in an astronomical telescope stand. As shown in FIG. 1A, the mechanical component 1 includes a cylindrical fixed portion 100, a movable portion 200 provided on one of the bases thereof as if to cover the base, and other elements. The movable portion 200 is provided to rotatable around the fixed portion 100 about an axis defined by a line that penetrates through a center of both bases in the fixed portion 100 (i.e., (a) shown in FIG. 1A, and hereinafter referred to as the "central axis"). A mechanical displacement of the movable portion 200 relative to the fixed portion 100

Figure 1B:
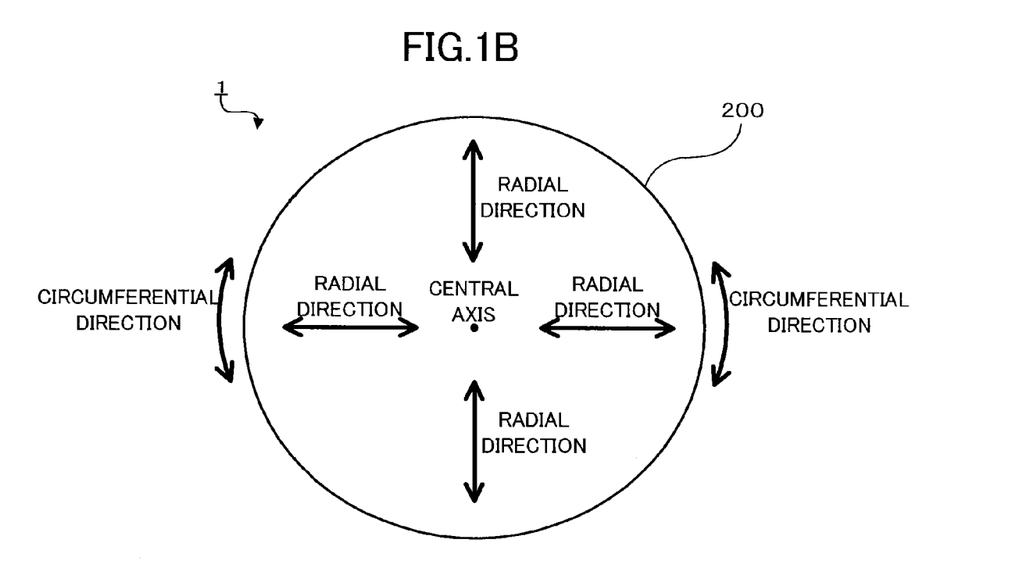
FIG. 1B is a plan view showing the mechanical component that includes the readhead control mechanism according to the embodiment of the present invention.

(for example, (b) shown in FIG. 1A) can be measured by the optical encoder 300, which will be discussed later. A measured result is then transmitted to a control part such as a processor (not shown in the figure) that controls the whole apparatus provided with the mechanical component 1. Here, note that in the following, a direction along a side surface of the movable portion 200 is referred to as the "circumferential direction", and a direction from the central axis to the side surface or a direction from the side surface to the central axis is referred to as the "radial direction" as shown in FIGS. 1A and 1B.

Figure 2:
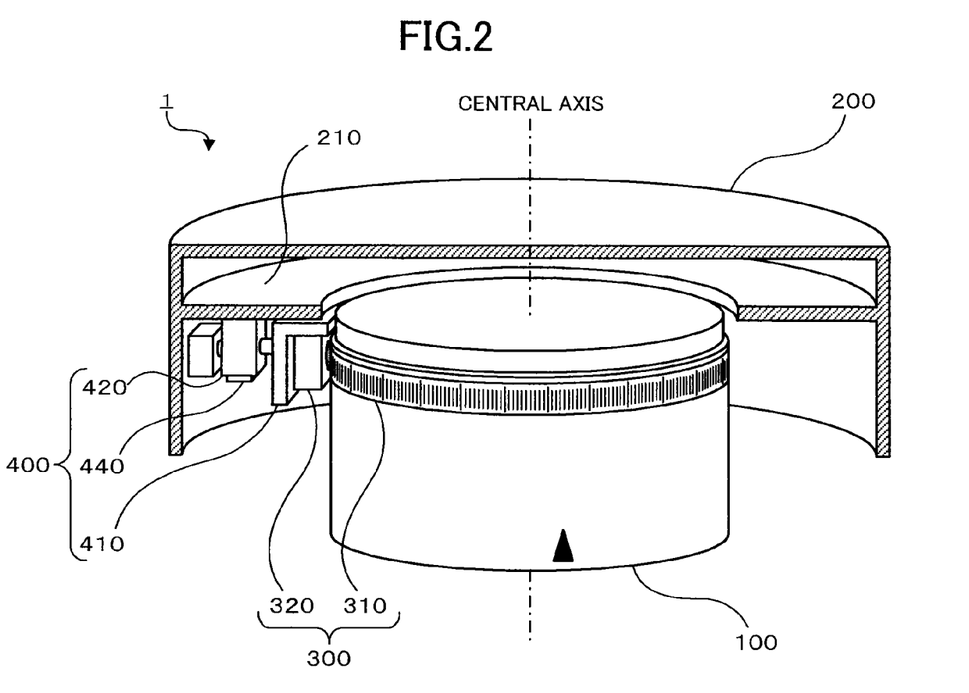
FIG. 2 is a perspective view showing the mechanical component with a half of a movable portion being cut off.

FIG. 2 shows the movable portion 200 with a half of the movable portion 200 being cut off for a better visual understanding of an internal structure of the mechanical component 1. As shown in FIG. 2, the mechanical component 1 includes the fixed portion 100, the movable portion 200, the optical encoder 300, and the readhead control mechanism 400.

The fixed portion 100 has a cylinder form, which forms a part of a rotating component. The strip shaped scale 310 is wrapped around the side surface of the fixed portion 100 in the circumferential direction.

The movable portion 200 is a cylindrical rotating body that is closed with bases, which is provided on one of the bases of the fixed portion 100 as if to provide a cover for one of the bases. The movable portion 200 is rotatably formed so as to rotate in the circumferential direction around the fixed portion 100 about the central axis that is taken as the axis of rotation. A ring shaped plate 210 is provided onto an inner circumference of the movable portion 200 at a generally right angle to a side surface of the fixed portion 100. The readhead 320 of the optical encoder 300, which will be discussed later, is secured onto one side of this plate 210 through a securing member 410.

The optical encoder 300 is an optical rotary encoder that measures the mechanical displacement of the movable portion 200 relative to the fixed portion 100. Here, the mechanical displacement means a rotational displacement of an object relative to another object (for example, an angle of rotation, a direction of rotation, or a rotational speed of an object relative to another object) or a linear displacement of an object relative to another object (for example, a relative amount of travel, a direction of travel, or a speed of travel of an object relative to another object) and the like. The optical encoder 300 includes the scale 310 and the readhead 320.

The scale 310 is a strip shaped scale that is marked with gradations of a predetermined pitch. The scale 310 is wrapped around on the side surface of the fixed portion 100 along the circumferential direction.

Figure 3:
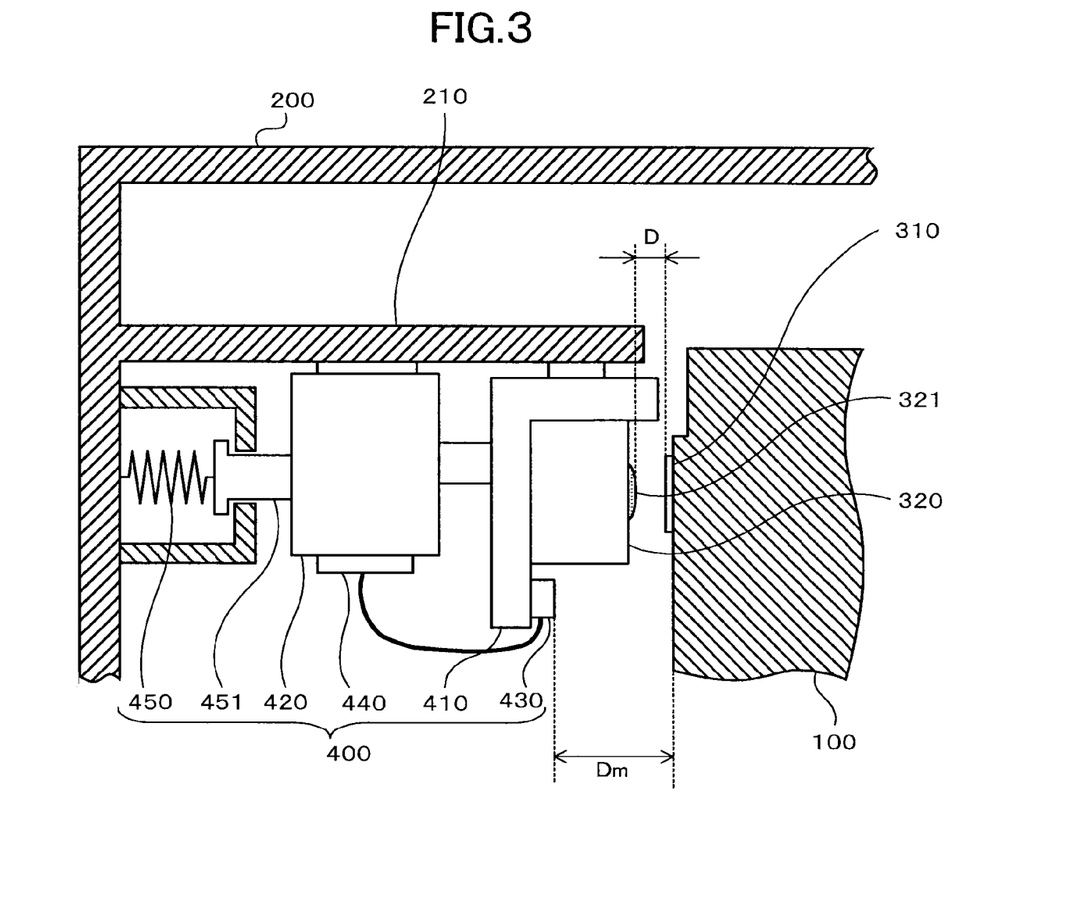
FIG. 3 is an explanatory view showing a structure of a readhead control mechanism according to Embodiment 1.

The readhead 320 is constituted by a detector that acquires position data from the gradation marks on the scale 310. As shown in FIG. 3, the readhead 320 includes a read-out portion 321 (for example, a photoreceptor and a camera) that optically reads out the gradation marks on the scale 310. The readhead 320 is provided on one side of the plate 210 in order to have the read-out portion 321 face the scale 310, and to keep a distance D between the read-out portion 321 and the scale 310 to be within the specified tolerance. The readhead 320 shifts along the scale 310 as the movable portion 200 rotates.

The readhead control mechanism 400 serves to control the position of the readhead 320 in order to maintain a constant distance D between the readhead 320 and the scale 310. The readhead control mechanism 400 is constituted by the securing member 410, an actuator 420, a distance sensor 430, an actuator controller 440, and a protective spring 450.

Figure 4A:
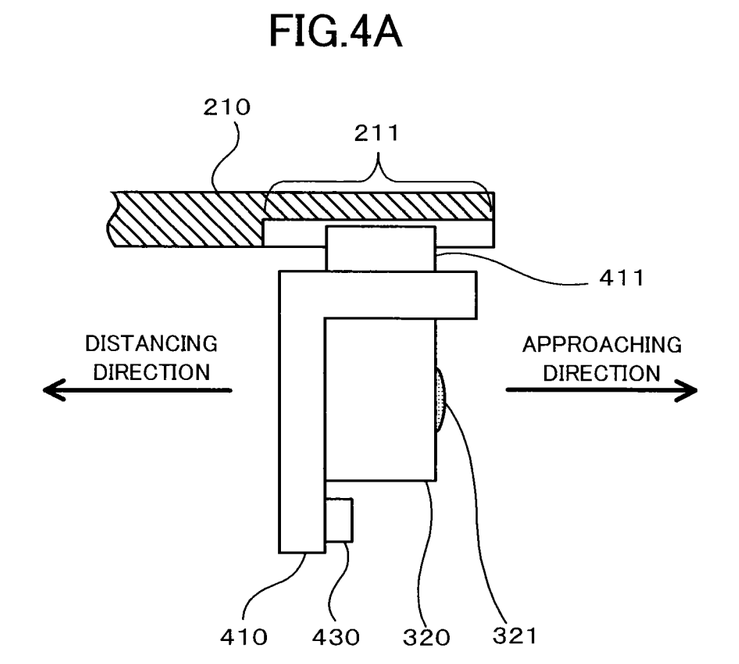
FIG. 4A is a side view showing a securing member.
Figure 4B:
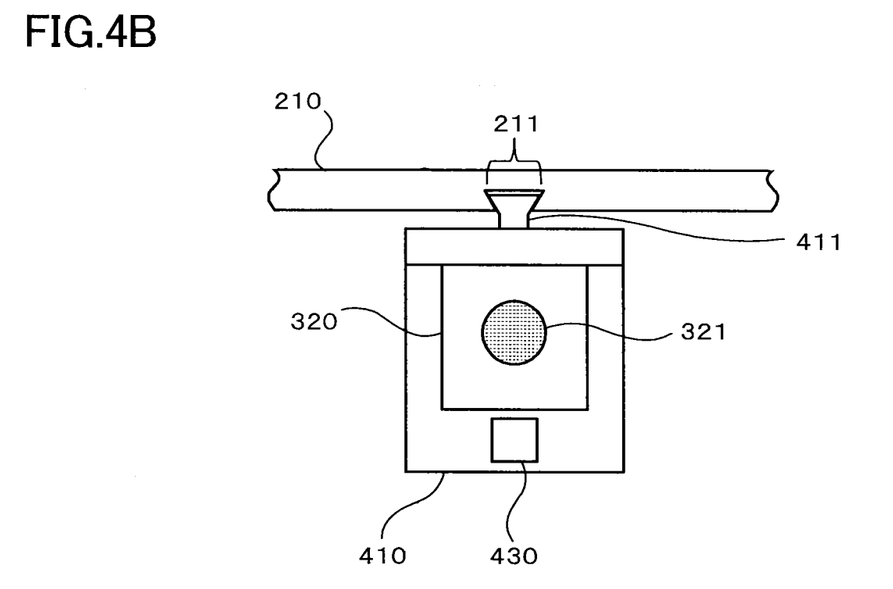
FIG. 4B is a front view showing the securing member.

The securing member 410 serves to secure the readhead 320 onto the movable portion 200. As shown in FIGS. 4A and 4B, a rail-like protrusion 411 is formed on a surface of the securing member 410 that opposes the plate 210, and is formed along a radial direction. A slot 211 that extends in the radial direction is formed on the one side of the plate 210. The protrusion 411 is slidably secured on the slot 211. The readhead 320 makes a shift in an approaching direction or in a distancing direction as the securing member 410 slides. Here, the "approaching direction" means a direction that the readhead 320 and the scale 310 are closing in on each other, and the "distancing direction" means a direction that the readhead 320 and the scale 310 distance away from each other. Note that a portion of the securing member 410 is extended beyond the readhead 320 so that the readhead 320 does not touch the scale 310.

Figure 5A:
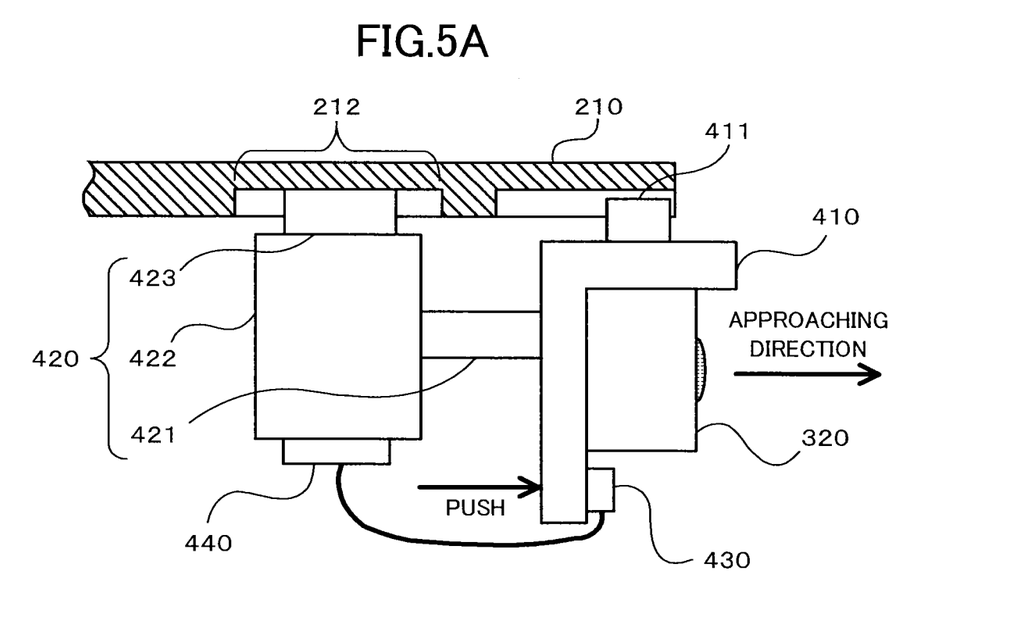
FIG. 5A is a side view showing an actuator.

The actuator 420 is constituted by a driving unit and the like that shifts the securing member 410 in the approaching direction or in the distancing direction. FIG. 5A shows the actuator 420 that is constituted by a rod shaped stem 421 with one end thereof being secured onto the securing member 410, and a main body 422 that applies a pushing force or a pulling force to the stem 421. When an electrical signal (hereinafter referred to as the "deviation signal") is received, the main body 422 applies the pushing force or the pulling force onto the stem 421 based on the received deviation signal, wherein the electrical signal is used to determine the amount of travel or the traveling speed that occur from the actuator controller 440, which will be discussed later, to the readhead 320. When the pushing force is applied by the main body 422, the stem 421 pushes the securing member 410 and shifts the readhead 320 in the approaching direction, as shown in FIG. 5A. Further, as shown in FIG. 5B, when the pulling force of the main body 422 is applied to the stem 421, the stem 421 then pulls the securing member 410 and shifts the readhead 320 in the distancing direction.

Figure 5B:
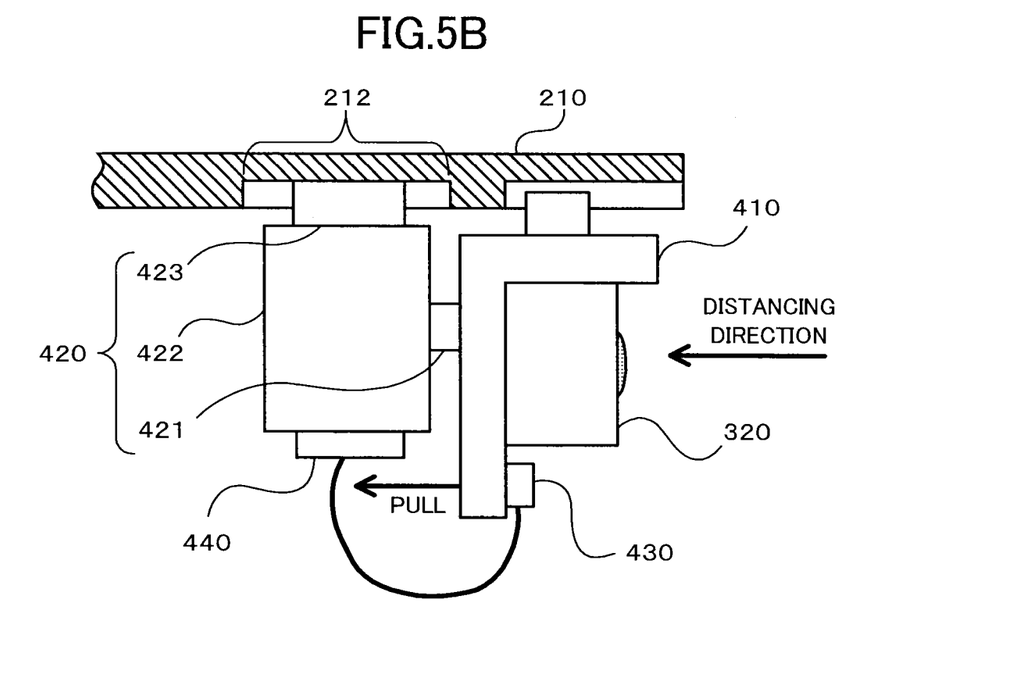
FIG. 5B is a side view showing the actuator.
Figure 5C:
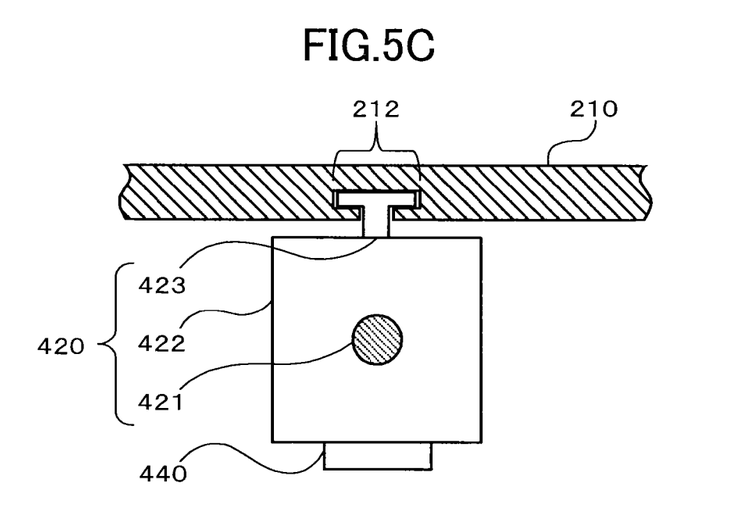
FIG. 5C is a front view showing the actuator.

FIGS. 5A to 5C show a surface of the main body 422 that sits opposite the plate 210 including a rail-like protrusion 423 formed along the radial direction. The plate 210 includes the slot 212 that extends in the radial direction. The protrusion 423 is slidably secured on the slot 212 so as to move smoothly only in the radial direction.

Now returning to FIG. 3, the distance sensor 430 is constituted by a sensor (for example, a gap sensor) that measures a distance between objects. The distance sensor 430 is provided on the securing member 410 to measure a distance Dm from the distance sensor 430 to the side surface of the fixed portion 100. Further, the distance sensor 430 converts the measured result into a distance D from the readhead 320 to the scale 310, then transmits the converted distance D to the actuator controller 440.

The actuator controller 440 is constituted by a processing unit such as a processor. The actuator controller 440 is operated according to a program stored in a ROM (Read Only Memory) or a RAM (Random Access Memory), not shown in the figures, to execute various operations including an "actuator control process", which will be discussed later.

Figure 6A:
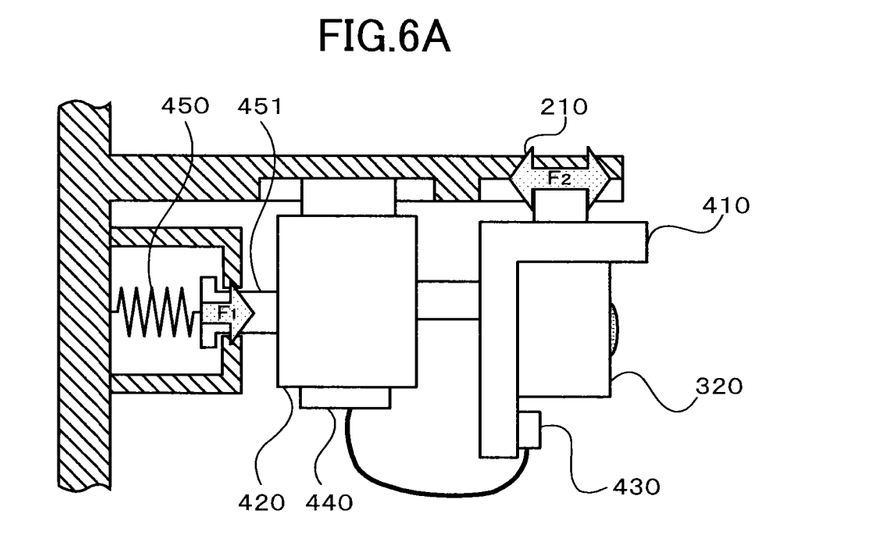
FIG. 6A is a view showing a protective spring that is secured onto the actuator.
Figure 6B:
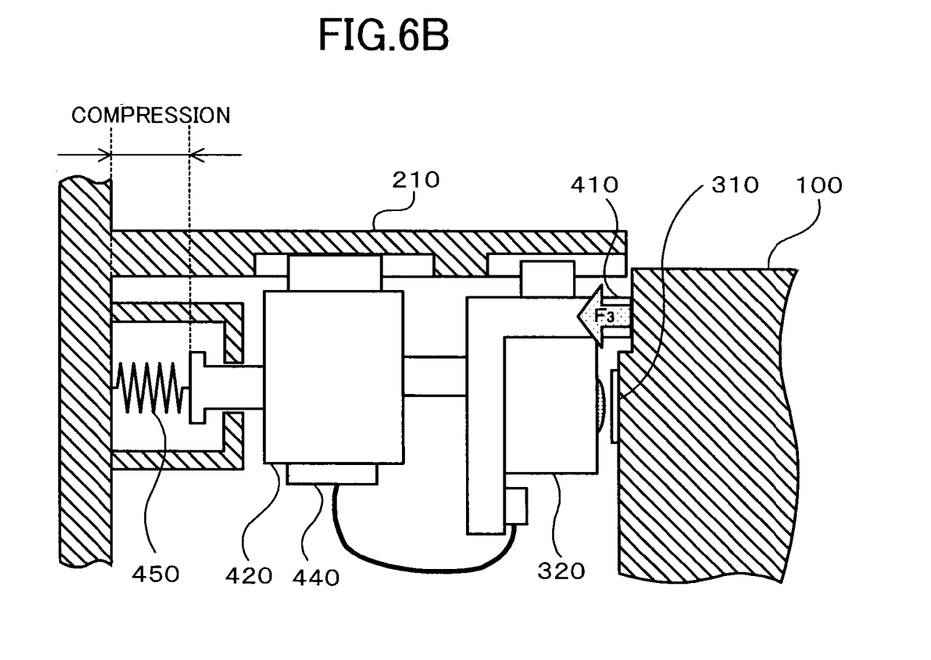
FIG. 6B is a view showing the securing member that is touching a fixed portion.

The protective spring 450 serves to prevent the scale 310 from touching the readhead 320 whenever a change has occurred in a positional relationship between the fixed portion 100 and the movable portion 200 due to, for example, an earthquake. FIG. 6A shows the protective spring 450 in a certain compression state is secured onto the actuator 420 through a component 451 so that a pushing force $F_1$ is applied to the actuator 420 in the approaching direction. Further, the pushing force $F_1$ applied in the direction that the protective spring 450 approaches is adjusted to be greater than a static friction force $F_2$ between the securing member 410 and the slot 211. Accordingly, in a normal condition, the actuator 420 would not shift in the distancing direction due to the pushing force $F_1$ applied by the protective spring 450. Yet, in any circumstances of an earthquake and the like that causes the positional relationship between the fixed portion 100 and the movable portion 200 to change, which eventually causes the securing member 410 to touch the side surface of the fixed portion 100, as is shown in, for example, FIG. 6B, a force $F_3$ is then applied to the actuator 420 through the securing member 410 in the distancing direction. This would make the force $F_3$ applied to the actuator 420 in the distancing direction to be greater than the pushing force $F_1$ so that a compression of the protective spring 450 is obtained. Therefore, the actuator 420 is shifted in the distancing direction.

Now, an operation of the readhead control mechanism 400 according to the embodiment is explained.

As soon as power is supplied to the readhead control mechanism 400, the distance sensor 430 measures a distance between the readhead 320 and the scale 310 then, a result from the measurement is transmitted to the actuator controller 440 at any time. Further, as soon as power is supplied to the readhead control mechanism 400, the actuator controller 440 initiates the "actuator control process" to control the actuator 420 to maintain a constant distance between the readhead 320 and the scale 310. Hereinafter, the "actuator control process" is explained with reference to the flowchart shown in FIG. 7.

Figure 7:
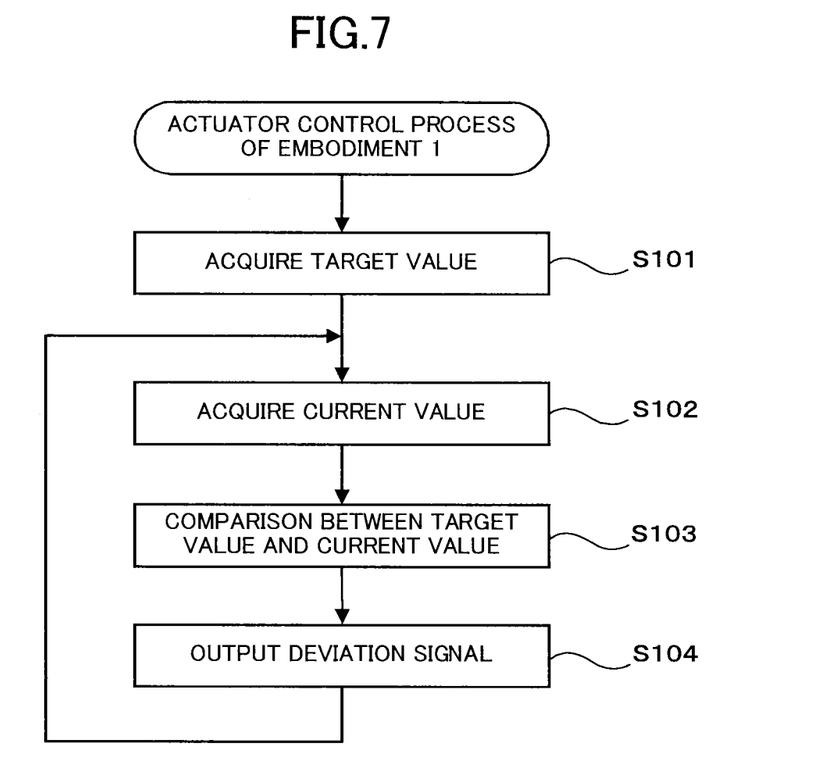
FIG. 7 is an explanatory flowchart showing an actuator control process according to Embodiment 1.

The actuator controller 440 acquires an ideal distance (hereinafter referred to as the "target value Dt") between the readhead 320 and the scale 310, acquired from the RAM (not shown in the figure) (step S101).

The actuator controller 440 acquires a current distance (hereinafter referred to as the "current value Dr") between the readhead 320 and the scale 310, from the distance sensor 430 (step S102).

The actuator controller 440 makes a comparison between the target value Dt acquired in the step S101 and the current value Dr acquired in the step S102 to obtain a distance d (step S103), a necessary distance for the readhead 320 to be shifted. In particular, the actuator controller 440 may obtain the distance d using Formula 1 as follows.

$$d = Dt - Dr \quad \text{(Formula 1)}$$

The actuator controller 440 converts the distance d obtained in the step S103 into, for example, an electrical signal having a voltage value that is proportional to the distance value d. The actuator controller 440 then outputs the converted voltage value to the actuator 420 as a deviation signal (step S104). The actuator 420 applies the pushing force or the pulling force to the readhead 320 through the securing member 410, based on the deviation signal that is output from the actuator controller 440. The actuator 420, for example, applies a greater force to the stem 421, the force that is greater in relation to the voltage value of the deviation signal. In other words, the greater the voltage value becomes, the faster the readhead 320 can be shifted. Here, note that the stem 421 may be controlled to have the actuator 420 push the securing member 410 when the voltage value of the deviation signal obtained is negative, and have the actuator 420 pull the securing member 410 when the voltage value of the deviation signal obtained is positive.

After completion of the output of the deviation signal, the actuator controller 440 returns to the step S102 to again acquire a value measured by the distance sensor 430.

According to the present embodiment, the actuator controller 440 controls the actuator 420 to maintain a constant distance between the readhead 320 and the attachment portions of the scale 310, so that regardless of the deformations in the attachment portions of the scale 310 or of the readhead 320 caused by heat, physical shock, or aging, the constant distance between the scale 310 and the readhead 320 can be maintained at all time. Therefore, the measurement precision and accuracy of the encoder can be maintained at a high level for a long period of time than if not using this approach.

Further, if any unsustainable force is applied to the readhead 320, the protective spring 450 would then immediately be compressed to separate the readhead 320 from the scale 310. Thus, any damage to the readhead 320 can be avoided regardless of the considerable deformation of the mechanical component 1, which may occur beyond a threshold of normal operation of the actuator 420 due to physical shocks such as an earthquake.

Embodiment 2

A thermal expansion of an object is proportional to the size of the object, the coefficient of linear expansion, and a rate of temperature change. Hence, if design data of a product such as the size of the object, the coefficient of linear expansion, and the rate of temperature change can be recorded in advance onto, for example, the RAM, and if the temperature change in the object can be measured using a temperature sensor, then the thermal expansion of the object is obtainable.

The readhead control mechanism 400 according to Embodiment 1 measures the distance between the readhead 320 and the scale 310 by using the distance sensor 430, and further, the actuator controller 440 controls the actuator 420 based on the result that is measured. In this, the thermal expansion of the object may be obtained based on the value measured by the temperature sensor, and further, the actuator 420 can be controlled by the actuator controller 440 based on this measured result. Hereinafter, in Embodiment 2, the readhead control mechanism 400 that controls the actuator 420 based on the value measured by the temperature sensor is explained with reference to the mechanical component 1 as an example.

Figure 8:
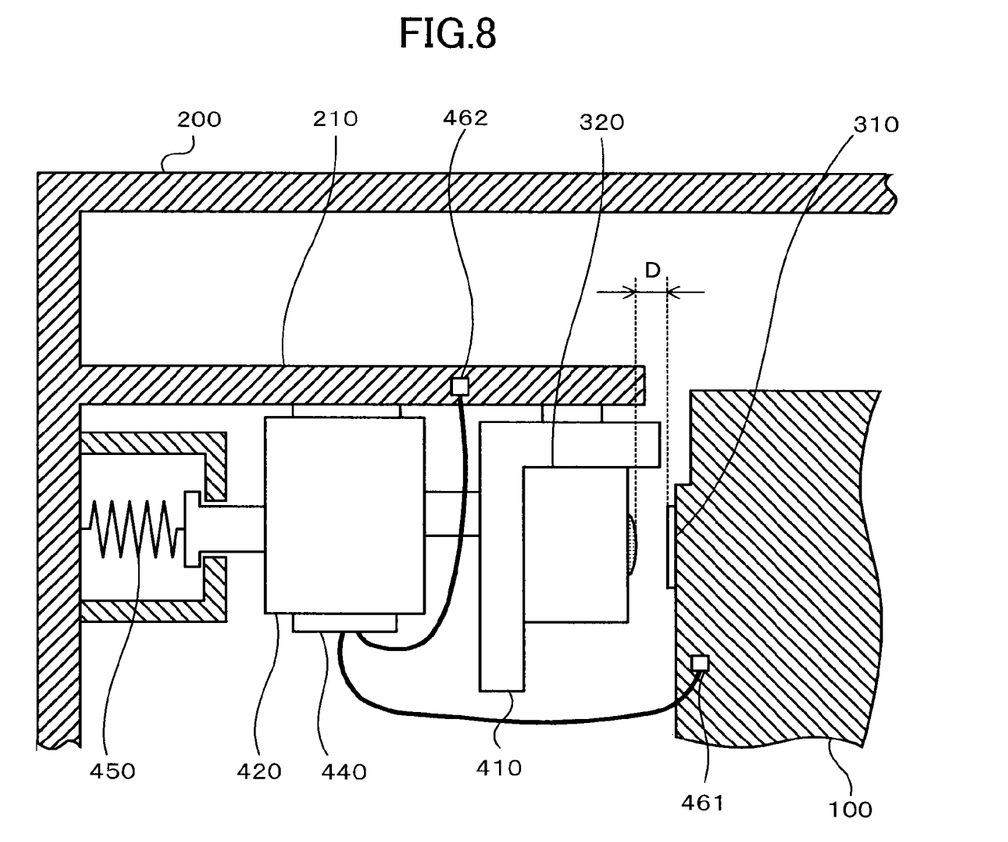
FIG. 8 is an explanatory view showing a structure of a readhead control mechanism according to Embodiment 2.

The mechanical component 1 is, like in Embodiment 1, constituted by the fixed portion 100, the movable portion 200, the optical encoder 300, and the readhead control mechanism 400. As shown in FIG. 8, the readhead control mechanism 400 is constituted by the securing member 410, the actuator 420, a temperature sensor 461, a temperature sensor 462, the actuator controller 440, and the protective spring 450.

The temperature sensor 461 and the temperature sensor 462 are respectively embedded into the fixed portion 100 and the movable portion 200. The temperature sensor 461 and the temperature sensor 462 respectively measure temperatures in the fixed portion 100 and in the movable portion 200, and output the results from the measurement to the actuator controller 440.

The actuator controller 440 is constituted by a processing unit such as the processor. The actuator controller 440 is operated according to the programs that are stored in the ROM or the RAM (not shown in the figure), and various operations including the "actuator control process", which will be discussed later, are executed. In the ROM or the RAM (not shown), the design data of the product in addition to program data for the actuator control processing are stored in advance.

Here, the "design data" means design data relevant to a thermal expansion of the mechanical component 1. The "design data" includes a "temperature Tt" during acquisition of the design data, a "length La" (for example, the radial direction distance from the central axis to the side surface) of the fixed portion 100 at the temperature Tt, a "length Lb" (for example, the radial direction distance from the central axis to a reference point of the plate 210) of the movable portion 200, a "coefficient of linear expansion Ca" of the fixed portion 100, and a "coefficient of linear expansion Cb" of the movable portion 200.

Explanations on other elements included in the mechanical component 1 are omitted for the reason that these other elements are the same as the elements included in Embodiment 1.

Now, operations of the readhead control mechanism 400 according to the present embodiment are explained.

As soon as the power is supplied to the readhead control mechanism 400, the temperature sensor 461 and the temperature sensor 462 respectively measure the temperatures in the fixed portion 100 and the movable portion 200, and send each measured result to the actuator controller 440 at any time. Further, as soon as the power is supplied to the readhead control mechanism 400, the actuator controller 440 initiates the "actuator control process" to control the actuator 420 to maintain the constant distance between the readhead 320 and the scale 310. Hereinafter, the "actuator control process" is explained with reference to the flowchart in FIG. 9.

Figure 9:
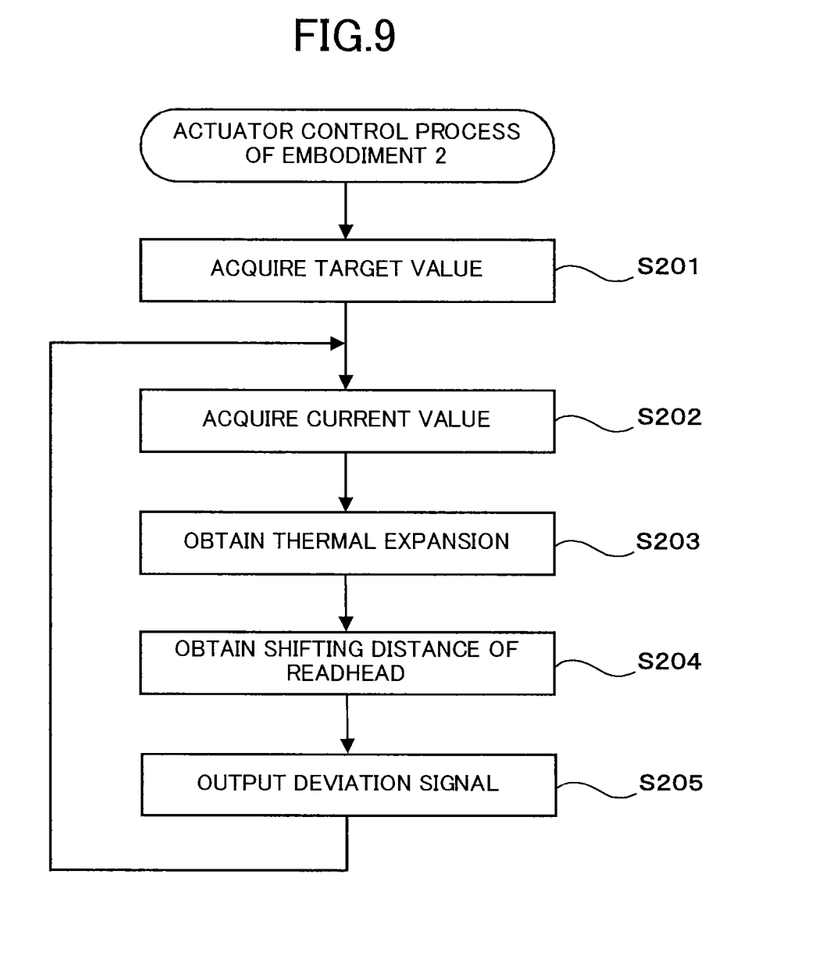
FIG. 9 is an explanatory flowchart showing an actuator control process according to Embodiment 2.

The actuator controller 440 acquires the design data of the mechanical component 1 from the ROM or the RAM (not shown in the figure), wherein the design data is stored in advance onto the ROM or the RAM (not shown in the figure) (step S201). As discussed above, the design data includes the "temperature Tt", the "length La" of the fixed portion 100 at the temperature Tt, the "length Lb" of the movable portion 200 at the temperature Tt, the "coefficient of the linear expansion Ca", and the "coefficient of the linear expansion Cb" of the movable portion 200.

The actuator controller 440 acquires a current temperature (hereinafter referred to as the "current value Tra") of the fixed portion 100 from the temperature sensor 461. Further, the actuator controller 440 acquires a current temperature (hereinafter referred to as the "current value Trb") of the movable portion 200 from the temperature sensor 462 (step S202).

The actuator 440 obtains a thermal expansion Za of the fixed portion 100 in a radius direction (for example, an increment within a distance from the central axis to the side surface) and a thermal expansion Zb of the movable portion 200 in a radius direction (for example, an increment within a distance from the central axis to the reference point on the plate 210), based on the design data acquired in the step S201, and on the current value Tra and the current value Trb acquired in the step S202 (step S203). In particular, the actuator controller 440 may obtain the thermal expansions Za and Zb by Formula 2 and Formula 3 given below.

$$Za = La \times Ca \times (Tra - Tt) \quad \text{(Formula 2)}$$

$$Za = Lb \times Cb \times (Trb - Tt) \quad \text{(Formula 3)}$$

The actuator controller 440 obtains a distance d that is necessary for the readhead 320 to be shifted, based on the thermal expansion Za and the thermal expansion Zb (step S204). In particular, the actuator controller 440 may obtain the distance d by Formula 4 given below.

$$d = Za - Zb \quad \text{(Formula 4)}$$

The actuator controller 440 converts the distance d obtained in the step S204 into, for example, an electrical signal having the voltage value that is proportional to the distance value d. The actuator controller 440 then outputs the converted voltage value to the actuator 420 as a deviation signal (step S205). Further, the actuator 420 applies the pushing force or the pulling force to the readhead 320 through the securing member 410, based on the deviation signal that is output from the actuator controller 440.

After completion of the output of the deviation signal, the actuator controller 440 returns to the step S202 to again acquire the current value from the temperature sensor 461 and from the temperature sensor 462.

According to the present embodiment, a constant distance between the scale 310 and the readhead 320 can be maintained regardless of the expansion and compression of the mechanical component 1 that may have been occurred from heat. Therefore, the high measurement precision and accuracy of the encoder can be maintained.

Figure 10:
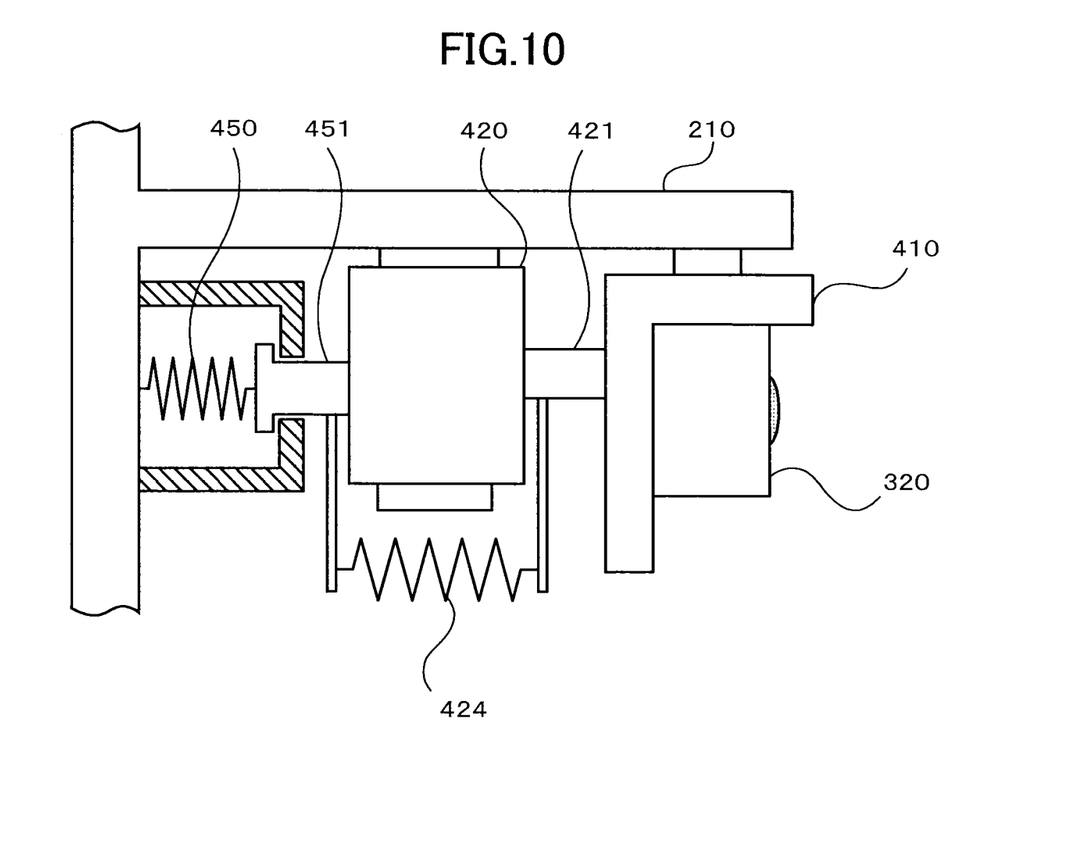
FIG. 10 is a view showing a pressurization spring provided for the actuator.

Here, as shown in FIG. 10, the actuator 420 may be configured to operate in parallel to the approaching direction and also to the distancing direction, and further, the actuator 420 may be included a pressurization spring 424 that pressurizes the stem 421 in the approaching direction or in the distancing direction. Due to the pressurization spring 424, a unidirectional force is constantly applied to the actuator 420. Hence, rattling of the actuator 420 can be prevented when a driving direction is reversed the course. Therefore, a length of the gap between the scale 310 and the readhead 320 can be controlled with high precision and accuracy.

Further, the optical encoder 300 including the readhead 320 controlled by the readhead control mechanism 400, is not limited to a rotary encoder. A linear encoder for measuring the linear displacement may be alternatively used.

In each of the aforementioned embodiments, the scale 310 is provided on the fixed portion 100, and the readhead 320 is provided on the movable portion 200. Yet, the scale 310 may be provided on the movable portion 200, and the readhead 320 may be provided on the fixed portion 100. For instance, the plate 210 can be secured on the side surface of the fixed portion 100 rather than on the movable portion 200, and in such case, the readhead 320 and the readhead control mechanism 400 that controls the readhead 320 would be provided on one side of the plate 210. Further, the scale 310 would be provided onto the inner circumferential surface of the movable portion 200. Then, the readhead 320 would read out the gradation mark on the scale 310 that is provided on the inner circumferential surface to measure the mechanical displacement of the movable portion 200 in relation to the fixed portion 100.

Here, note that in the each of the aforementioned embodiments, the mechanical component 1 is secured onto the fixed portion 100, and the movable portion 200 is provided to rotate around the fixed portion 100. Yet, the fixed portion 100 may be provided to rotate around the movable portion 200. Further, the fixed portion 100 and the movable portion 200 may be provided to have rotation take place by both the fixed portion 100 and the movable portion 200.

Further, note that in the each of the aforementioned embodiments, the actuator controller 440 and the actuator 420 adopt separate structures, yet the functionality contained in the actuator controller 440 may be incorporated into the actuator 420. Yet further, the functionality contained in the actuator controller 440 may be incorporated into the control part that controls the device that includes the mechanical component 1.

Further, note that in the each of the aforementioned embodiments, the readhead control mechanism 400 and the optical encoder 300 adopt separate structures, yet the readhead control mechanism 400 may be structured as a part of the optical encoder 300.

Furthermore, the object on which the optical encoder 300 and the readhead control mechanism 400 are provided should not be limited to relatively large structures such as large astronomical telescopes. The object may certainly include relatively small structures such as small motors.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A readhead control mechanism for controlling a readhead included in an optical encoder that measures a mechanical displacement between a first object and a second object by reading out a scale provided on the first object by the readhead provided on the second object, comprising:
  a securing member for securing the readhead onto the second object so that the readhead can be shifted in an approaching direction that the readhead approaches the scale, and in a distancing direction that the readhead distancing away from the scale;
  an actuator that is directly or indirectly secured onto the readhead, for shifting the readhead in the approaching direction or in the distancing direction; and
  an actuator controller for controlling the actuator to maintain a constant distance between the readhead and the scale; and
  a protective spring that is secured onto the actuator, for shifting the actuator in the distancing direction by compression, wherein
  the protective spring shifts the actuator and the readhead in the distancing direction by being compressed when a force by the first object is applied to the readhead or to the securing member.

2. The readhead control mechanism according to claim 1, further comprising a distance sensor for determining a distance between the readhead and the scale, wherein the actuator controller controls the actuator based on a measurement result obtained by the distance sensor.

3. The readhead control mechanism according to claim 1, wherein the actuator further comprising a stem for applying a pushing force or a pulling force to the readhead, in the approaching direction or in the distancing direction, respectively, and
  a pressurization spring for pressurizing the stem in the approaching direction or in the distancing direction.

4. An optical encoder comprising:
  a readhead controlled by the readhead control mechanism according to claim 1.

5. A readhead control mechanism for controlling a readhead included in an optical encoder that measures a mechanical displacement between a first object and a second object by reading out a scale provided on the first object by the readhead provided on the second object, comprising:
  a securing member for securing the readhead onto the second object so that the readhead can be shifted in an approaching direction that the readhead approaches the scale, and in a distancing direction that the readhead distancing away from the scale;
  an actuator that is directly or indirectly secured onto the readhead, for shifting the readhead in the approaching direction or in the distancing direction; and
  an actuator controller for controlling the actuator to maintain a constant distance between the readhead and the scale; and
  a temperature sensor for determining a temperature of both the first object and the second object, wherein
  the actuator controller calculates a thermal expansion value for both the first object and the second object based on a measurement result obtained by the temperature sensor, and controls the actuator based on a calculated thermal expansion value.

* * * * *